US010861032B2

(12) United States Patent
Whitmore et al.

(10) Patent No.: US 10,861,032 B2
(45) Date of Patent: Dec. 8, 2020

(54) DATA VALIDATION AND DIGESTIBLE CONTENT OBJECT GENERATION

(71) Applicant: salesforce.com, inc., San Francisco, CA (US)

(72) Inventors: Samuel Winton Whitmore, Portland, OR (US); Samuel Parsons, Washington, DC (US); Bradley P. Robinson, San Francisco, CA (US); Charles Heredia, Daly City, CA (US); Shacarah Gagnon-Kvale, Duluth, MN (US)

(73) Assignee: salesforce.com, inc., San Francisco, CA (US)

( * ) Notice: Subject to any disclaimer, the term of this patent is extended or adjusted under 35 U.S.C. 154(b) by 84 days.

(21) Appl. No.: 16/263,083

(22) Filed: Jan. 31, 2019

(65) Prior Publication Data
US 2020/0250690 A1 Aug. 6, 2020

(51) Int. Cl.
*G06Q 30/00* (2012.01)
*G06Q 30/02* (2012.01)

(52) U.S. Cl.
CPC ..... *G06Q 30/0204* (2013.01); *G06Q 30/0246* (2013.01); *G06Q 30/0269* (2013.01); *G06Q 30/0276* (2013.01)

(58) Field of Classification Search
None
See application file for complete search history.

(56) References Cited

U.S. PATENT DOCUMENTS

| 2008/0172446 | A1* | 7/2008 | Donovan | H04N 21/443 709/202 |
| 2010/0229024 | A1* | 9/2010 | Hawkins | G06F 9/546 714/2 |
| 2017/0374027 | A1* | 12/2017 | Fischer | H04L 63/0218 |
| 2019/0034280 | A1* | 1/2019 | Casey | G06F 11/3013 |

OTHER PUBLICATIONS

STIC EIC 3600 Search Report for application 16263083 dated Jul. 13, 2020 (Year: 2020).*

* cited by examiner

*Primary Examiner* — Matthew T Sittner
(74) *Attorney, Agent, or Firm* — Holland & Hart LLP

(57) ABSTRACT

A server may be utilized as a content management server for receiving, validating, and formatting an object for use by a second server. The server may receive a selection of a digital communication message type, receive a set of content data corresponding to the selected message type and an indication of one or more target segments. Based on the selected communication message type, the server may validate the data. If the data is validated, then the server generates a communication message content payload object. The communication message content payload object is formatted based on the requirements of the second server, such that the second server may efficiently process the objects for distribution of communication messages using the data of the object. The second server may generate and transmit previews of messages to the first server, for review and approval by an authorized user.

18 Claims, 11 Drawing Sheets

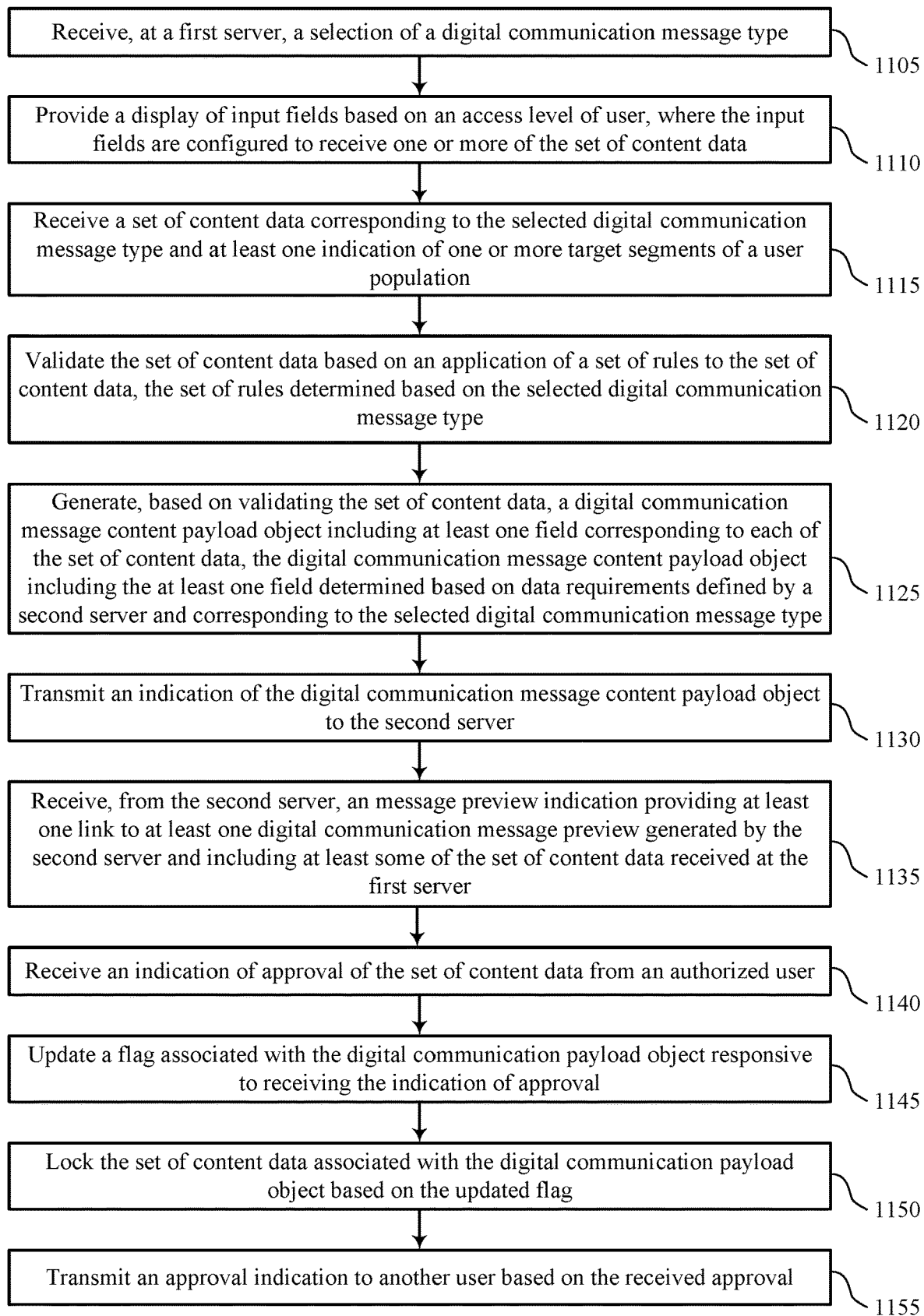

DATA VALIDATION AND DIGESTIBLE CONTENT OBJECT GENERATION

FIELD OF TECHNOLOGY

The present disclosure relates generally to database systems and data processing, and more specifically to data validation and digestible content object generation.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

A cloud platform may support mass email distribution to many subscribers. In some cases, the emails may include dynamic content, with different content for different target users. To utilize the cloud platform email system, a marketing coordinator may be required to generate custom emails, populate the emails with different content, have the email approved by an administrator of the email system, manually input the emails into the system, and identify target subscribers.

BRIEF DESCRIPTION OF THE DRAWINGS

FIGS. 8 through 11 show flowcharts illustrating methods that support data validation and digestible content object generation in accordance with aspects of the present disclosure.

DETAILED DESCRIPTION

Figure 1:
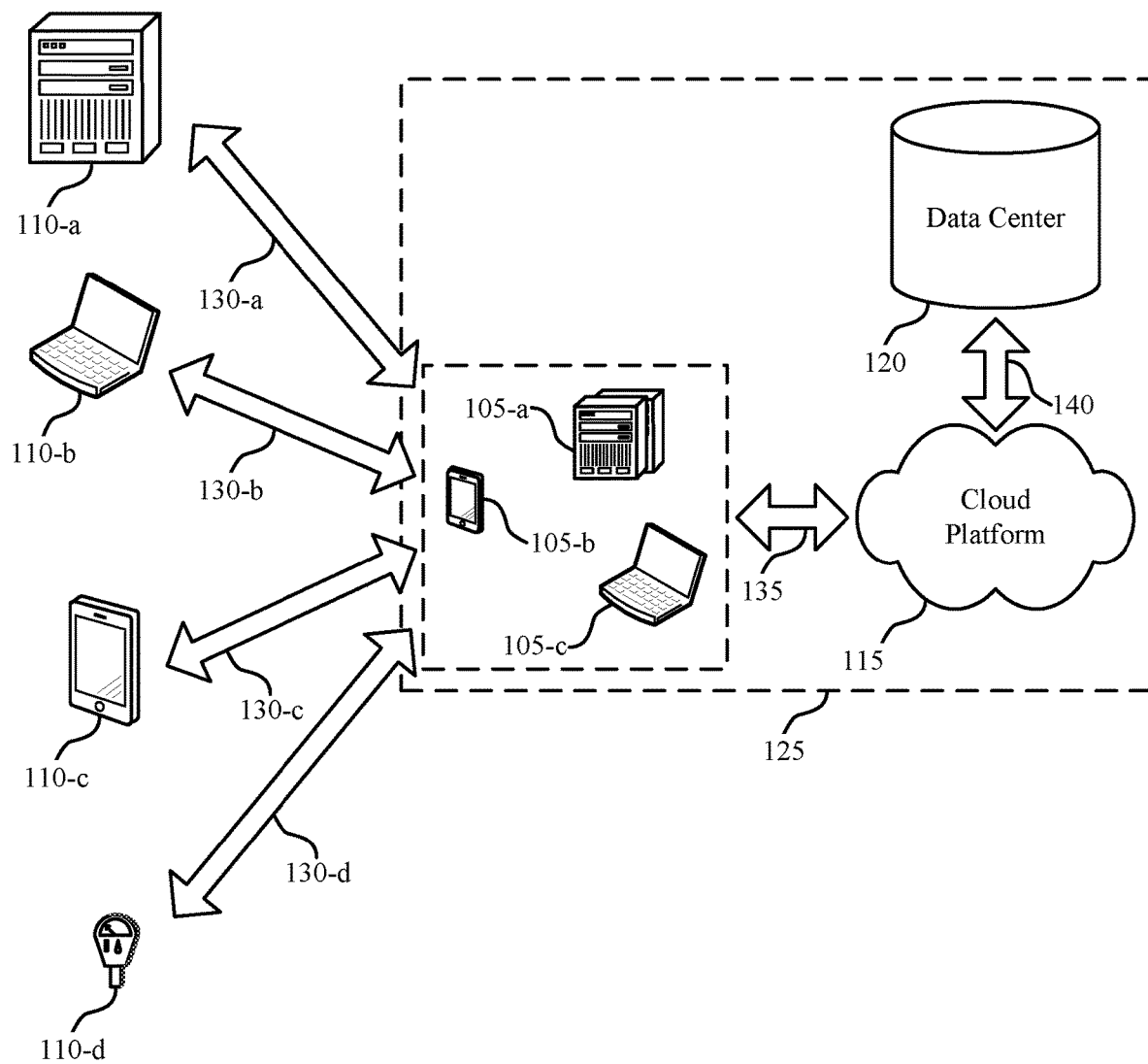
FIG. 1 illustrates an example of a system for data processing that supports data validation and digestible content object generation in accordance with aspects of the present disclosure.

A first server presents a form user interface (UI) in which a marketing coordinator may select a content type and input relevant data. The first server may execute a set of rules on the received data to validate content of the data and format of the data. The data may include multiple versions of content (e.g., different images, subject lines, etc.) for AB testing and/or for customization purposes. The first server generates an object based on a communication template, and the object is sent to a second server, which may be an example of a communication server. Multiple message previews (e.g., based on different versions of content) may be generated by the second server based on the received object before the messages are distributed. Furthermore, because the email data is included in an object digestible by the email system, the email system may generate custom emails for every target user segment and may generate different email versions for testing purposes, and an administrator is not required to encode the various different emails.

The first server, which may be an example of a content management server (CMS), may present a UI, in which a user may select a digital communication message type (e.g., emails, notifications, webinars, industry offer). Based on the selected communication message type, the first server may modify the UI form to present input fields for content and receive the content via the input fields. The content received via the input fields may correspond to a set of content data. Furthermore, the first server may receive, via the presented UI form, a set of indications of target segments of a user population. The target segments may correspond to user identifiers which are categorized in one or more different segments based on attribute data associated with the user identifiers. Thus, a user may generate content and target the generated content to certain segments. The first server may further validate the received data based on rules corresponding to the selected communication message type. The rules may be based on visual or technical attributes of the selected message type. For example, an email includes a limited character length for a subject line, two images, etc. Based on the received data and responsive to validating the data, the server may generate a payload object including fields corresponding to the received data. The payload object may be formatted based on the requirements of a second server (e.g., a communication server).

The second server, which may be a communication server as described herein, may execute a communication engine, which selects communication content stored in association with the second server and selects a plurality of user identifiers based on data included in or associated with content objects. Because the second server may select, transmit, and monitor feedback associated with a high volume of messages in any given time period, the communication data is formatted in a manner which is easily processable. Accordingly, the first server receives and formats the content data according to the requirements of the second server and transmits an indication of the payload object to the second server. The second server may store the object or contents of the payload object in respective data stores for processing and distribution, when ready. The second server may further generate a preview of a message based on the payload object, which may be received and viewed at the first server. Once the message is approved by an authorized user, a flag may be set on the payload object at the second server, and the second server may process and distribute messages based on the data.

Accordingly, the first server may provide a platform to receive and format data and receive approval for data for inclusion in distributed communication messages. The platform may receive various different versions of content for different communication messages, tag the content for relevant users, and generate the object for processing by the communication server. Thus, the communication server does not utilize processing resources for presenting UIs, validating data, tagging data, generating messages, etc. The communication server is able to utilize processing resources for complex data analysis, message distribution, and feedback analysis. Furthermore, a user of the communication server is not required to enter custom emails for each different type of content (e.g., different subject lines, images, copy, etc.) to be distributed. Rather, the first server may utilize the object generation capability to include various different types of content, which may be included in messages generated by the communication server.

In some cases, the first server may receive a selection of a communication template and generate the object based on the selected template. The template may define various visual features to the object, which may be used to generate the messages. The first server may further associate segment identifiers to pieces of content received by the first server. The segment identifiers may be based on the segments indicated by the user. The segment identifiers may be used by the communication server to match the content to the user identifiers. In some implementations, the first server may receive a task identifier and associate the task identifier to pieces of content that may be included in messages. The task identifier may be utilized by the communication server and corresponding systems to track engagement and other metrics associated with a task. In some cases, the first server may present form fields to users based on authorization levels associated with the user. For example, certain users may be required to approve the content included in messages before the messages are processed by the communication server. Accordingly, the first server may present, to those authorized users, a UI field or dialogue which may be utilized to approve content.

Aspects of the disclosure are initially described in the context of an environment supporting an on-demand database service. Aspects of the disclosure are further described with respect to systems, a server, and a process flow supporting data validation and digestible content generation Aspects of the disclosure are further illustrated by and described with reference to apparatus diagrams, system diagrams, and flowcharts that relate to data validation and digestible content object generation.

FIG. 1 illustrates an example of a system 100 for cloud computing that supports data validation and digestible content object generation in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

As described, the data center 120 may include multiple servers, which may include examples of content management servers and communication servers. A first server (or set of servers) of the data center 120 may support data validation and content object generation, where the content object is digestible by the second server (or a set of servers) for communication distribution and tracking. Accordingly, the first server may support receipt of content and segment identifications, validation of received data, and generation of content objects for receipt and processing by the second server. Further, the first server may receive message previews based on content objects generated by the second server. The first server may support receiving approval of content (e.g., based on the previews) and setting a flag of the previously transmitted content object such that messages may be generated and transmitted based on the content object.

In conventional systems, a user, manager, and/or a developer may be required to enter a custom communication message to the communication server for distribution. For example, a user may generate the copy of a message, a manager may select the format, color, images, etc. for the message, and a developer may program or configure the message using hypertext markup language (HTML) and enter the message to the communication server for processing. Thus, when a task or campaign requires various messages including many pieces of content, the developer is required to format and program the different messages. Further, because a communication server may process a high volume of messages, and the processing may include selecting relevant users for receiving various content and messages, distributing the messages, and monitoring feedback, the content of the messages is required to be stored in a certain format that is digestible by the communication server.

In contrast, the data center 120 supports a server that may function as a content management server to support receipt, validation, and formatting of data for digestion and processing by a separate communication server and receipt of message previews from the communication server. Accordingly, the first server leverages the functionality of the communication server for message generation (e.g., for previews and final messages), distribution, and tracking, while the second server (e.g., the communication server) receives preformatted content objects and processes the objects for message distribution and tracking. This setup allows each server to function as initially designed, while also allowing messages to be generated using dynamic content and distributed to segments of a user population based on received input, without significant reconfiguration of the communication server.

The first server (e.g., content management server) of the data center 120 receives a selection of a communication message type and receives a set of content data corresponding to the selected message type. The first server may further receive an indication of one or more target segments of a user population. The indication may be based on selection of a product, business type, customer classification, persona, etc. The first server may apply a set of target segment identifiers to the received content based on the indication of the segments. These identifiers may be used by the communication server for matching the content with user identifiers for receiving the content. The first server validates the data and generates a content payload object, which is formatted based on the requirements of the communication server. The first server communicates the object to the communication server and receives a message preview from the communication server, and the message preview is generated by the communication server (e.g., using the functionality of the communication server).

It should be appreciated by a person skilled in the art that one or more aspects of the disclosure may be implemented in a system 100 to additionally or alternatively solve other problems than those described herein. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

In an example of utilization of the system 100, a user at a client 105 may access a UI supported by one or more servers of the data center 120. The user may be setting up a series of communications for distribution by a communication server (e.g., the series of communication messages may comprise a marketing campaign). The user may select a message type and enter content via a UI form at the client 105. The content may be entered based on the selected message type, and the content may include various features such as subject, copy, images, theme, etc. The user may also enter one or more target segments, which may correspond to classifications of a target user population which may receive the messages. A first server may receive the content and target segment indication, validate the content, generate a content payload object based on content and requirements of a communication server, and transmit the object to the communication server. The communication server may process the message and generate a set of message previews based on the content and content variations. The first server may receive links to the message previews and present the previews to the user. The user may modify the content and submit the content for approval. An authorized user (e.g., marketing manager) may review and approve the content, which may trigger further processing and distribution of messages by the communication server.

Figure 2:
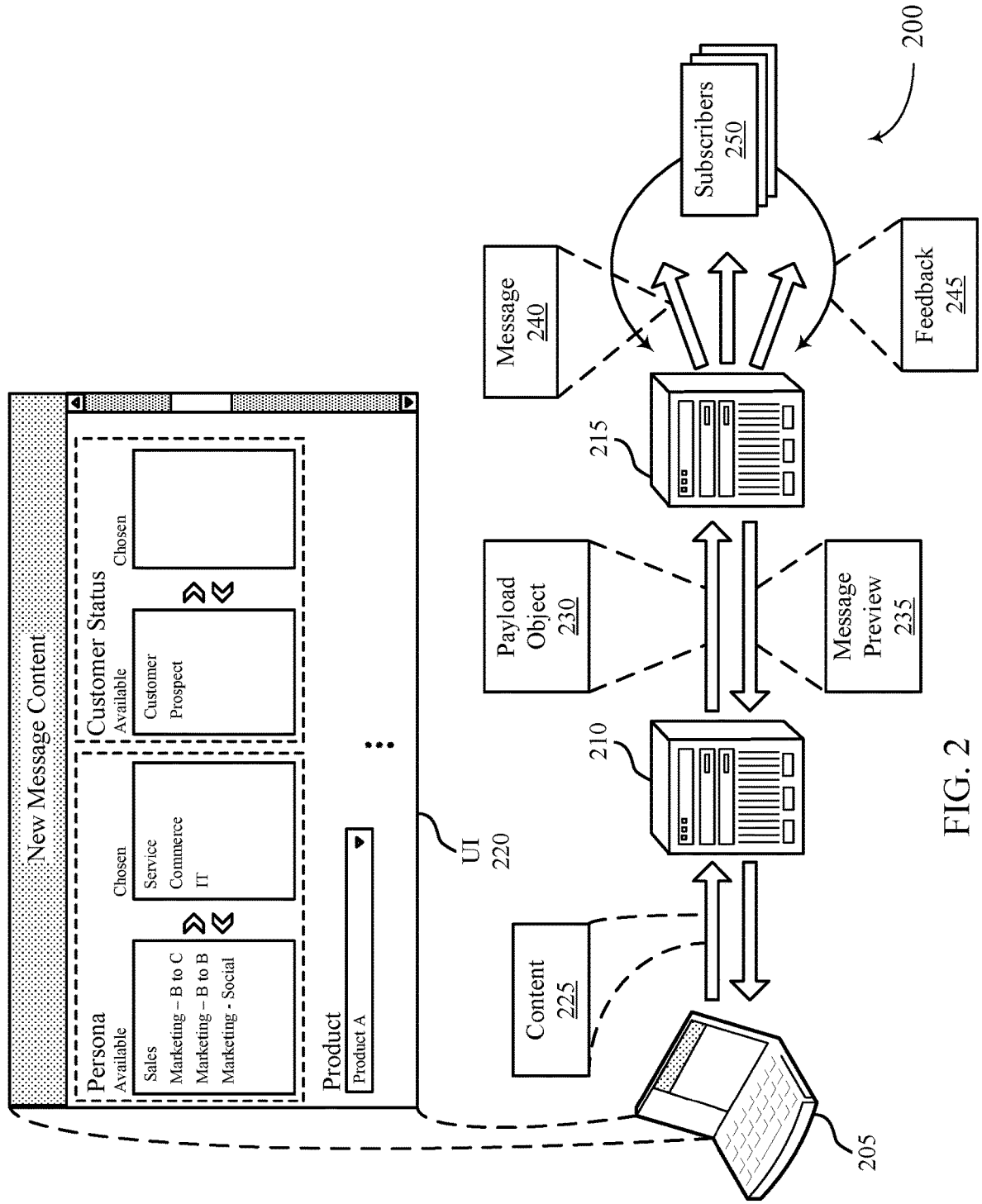
FIG. 2 illustrates an example of a block diagram of a system that supports data validation and digestible content object generation in accordance with aspects of the present disclosure.

FIG. 2 illustrates an example of a block diagram 200 of a system that supports data validation and digestible content object generation in accordance with aspects of the present disclosure. The block diagram 200 includes a user device 205, which may be an example of a client 105 or contact 110 of FIG. 1. The block diagram 200 further includes a first server 210 and a second server 215. The first server 210 and the second server 215 may be examples of various components of the data center 120 of FIG. 1. The first server, which may be an example of a content management server, supports a UI 220, which is accessed by a user of the user device 205.

Using the UI 220, the user may select a digital communication message type. The types may include a push notification, email (e.g., webinars, industry offer, product), or any other type of digital communication message. Based on the selected type, the UI may present various fields for receiving data. The fields may include name, record type, copy, images (e.g., entered via links or uploaded), subject line, start date, end date, etc. In some cases, the user may select a message template, which may define some visual features of the resulting message. As illustrated in FIG. 2, the user may further enter a "persona," "customer status," and "product," and these selections may correspond to target users of a user population. Thus, if a user selects one or more personas, then the messages generated using the entered data may be targeted to users associated with the selected personas. Similarly, users associated with the customer statuses (e.g., customer or prospect) and users associated with the selected product (e.g., users that have demonstrated an interest in the selected product) may be selected for receipt of messages based on the entered data. It should be understood that other target segments may be indicated, such as business size, business type, etc.

In some cases, the user population corresponds to a number of subscribers to a service and may be referred to as a subscriber record. The second server 215 may maintain a list of users and attribute data associated with the users. The attribute data may be based on user interaction history (e.g., based on prior communications), selection of interests, product ownership, job title or description, etc.

Based on data entered into various fields to the UI 220, the first server 210 receives content 225 and at least one indication of one or more target segments of the user population (e.g., based on entered persona, customer status, product). Further, the first server 210 applies a set of validation rules to the received content 225 based on the selected communication message type. For example, a character count may be applied to subject lines of emails, and image formatting and selection rules may be applied to selected or input images. After validating the data using the rules, the first server 210 generates and transmits an indication of a digital communication message content payload object 230 including fields corresponding to the entered data. The object 230 may be formatted based on the requirements of the second server 215. In some cases, generation and transmission of the object 230 may include executing a series of application programming interface (API) calls of the second server 215. For example, the second server 215 may generate folders or storage locations for the content 225, generates audience segment identifiers, generates and schedules automations, etc. using various API calls. The second server 215 may verify authentication and queue the API calls and execute the calls until completion or an error is generated. Based on the calls corresponding to the payload object 230, the second server 215 stores the object content in respective data stores. In some cases, the API calls may generate content identifiers, which may be associated with the various pieces of content 225 and used by the second server 215 to track interaction with messages and message content.

Generation of the payload object 230 may further include generating a set of target segment identifiers based on the indications of the target segments. In some cases, the first server 210 associates target segment identifiers with the payload object 230 or with various fields of content (e.g., subject line, copy, images) of the payload object 230.

Based on the received payload object 230 (e.g., via the API calls), the second server 215 may generate one or more message previews 235, which are transmitted to the first server 210. The message previews may comprise a formatted message (e.g., in HTML) generated by the second server 215, and the previews may include content 225 received via the UI 220. In some cases, when different versions of content are input at the UI 220 (e.g., for AB or ABn testing), the previews may include a preview for each different version of the content. Yet further, the second server 215 may generate different messages for different target audiences, and the message preview 235 may include previews of the different messages. The message previews 235 may be transmitted via an indication, which may include one or more links (e.g., URLs) to the previews.

After the payload object 230 is generated based on content 225 and transmitted to the second server 215, various different users may access a version of the UI 220 to update, change, and/or approve the content 225 intended for message distribution. For example, a first user (e.g., a client) may input various content 225 in the UI 220 for inclusion in a series of related messages. After the object 230 is generated and a preview 235 is received, a second, higher level user (e.g., marketing manager) may view and approve the various messages and content. Accordingly, based on authorization level of the user, the UI 220 may provide different fields, such as approval fields, image fields, etc. If the second user approves the messages previews 235 via the UI 220, then the first server 210 may set a flag or field in the payload object 230 stored by the second server 215 to signal, to the second server 215, that the messages are ready for processing and/or distribution.

Based on the flag or other fields (e.g., including the start date and end date associated with the payload object 230), the second server 215 may process the object to generate messages, identify target users (e.g., based on target segment identifiers associated with the payload object 230), distribute messages to the target users, and monitor feedback associated with the distributed messages. As illustrated in FIG. 2, the second server 215 distributes messages 240 to a plurality of subscribers 250. In some cases, the distribution of messages 240 may include transmitting emails to user email addresses, pushing notifications, sending social media posts, etc. The second server 215 may also monitor feedback 245 associated with the distributed messages 240. The feedback 245 may indicate whether a user opened a message, clicked a message, etc. The second server 215 may generate feedback metrics associated with the feedback 245, and the metrics may correspond to different segments of the user population, different content and/or versions of content included in the messages, a series of messages, or a combination of these. The second server may utilize the different identifiers (e.g., content identifiers, task identifiers, segment identifiers) to determine various feedback metrics.

Figure 3:
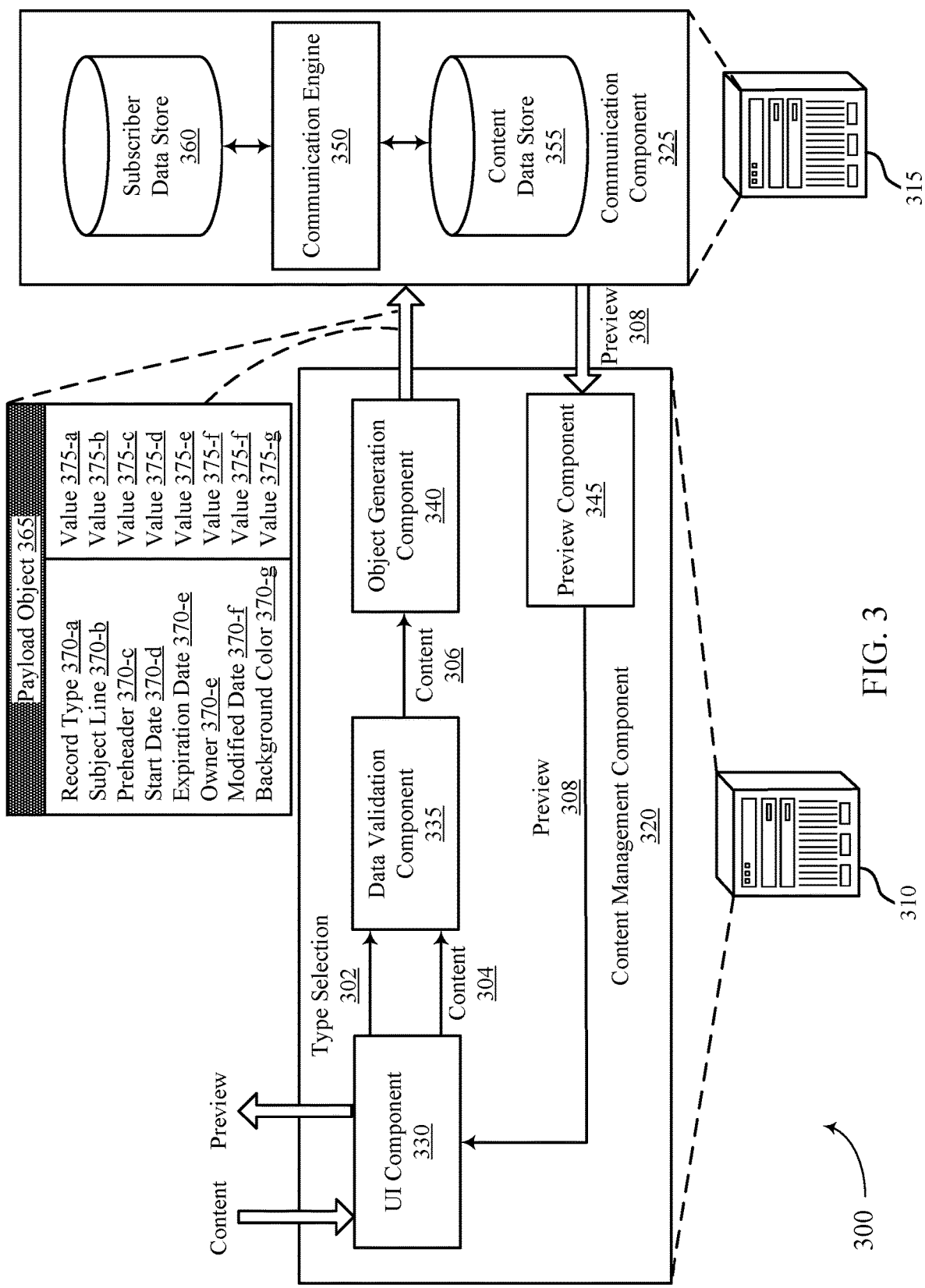
FIG. 3 illustrates an example of a block diagram of a server that supports data validation and digestible content object generation in accordance with aspects of the present disclosure.

FIG. 3 illustrates an example of a block diagram 300 of a server that supports data validation and digestible content object generation in accordance with aspects of the present disclosure. The block diagram 300 includes a first server 310 and a second server 315. The first server 310 may be an example of the first server 210 of FIG. 2, and the second server 315 may be an example of the second server 215 of FIG. 2. The first server 310 executes a content management component 320. A UI component 330 of the content management component 320 may support a UI displayed at a user device, at which a user may select a communication type and enter content associated with the communication type. The UI component 330 transmits an indication 302 of the selected communication type and the received content 304 to the data validation component 335. The content may include indications of target segments for receiving the messages based on the input content. Example target segment types may include business size, product, customer status, etc. Based on the selected communication type, the data validation loads and applies a set of rules to the content 304. The rules may verify that the content conforms to various requirements (e.g., visual requirements) of an organization (e.g., a cloud client 105 of FIG. 1) and to requirements of the communication type, such as technical requirements (e.g., character limits, image size, etc.). If the content 304 does not confirm to the requirements based on the application of the set of rules, then the UI component 330 may transmit an indication to the user device to notify the user to change a piece of content or to notify the user that the data is non-conforming.

If the content 304 does conform to the requirements based on the rules application, then the data validation component 335 may transmit the content 306 to an object generation component 340, which may generate a payload object 365 for the second server 315. The payload object 365 may include various fields 370 with corresponding values 375. The values may include the content received at the UI component 330 and/or values generated based on content received at the UI component 330. The fields 370 may be determined based on the selected communication type as well as requirements of the second server 315. The payload object 365 may comprise additional and other fields 370 as illustrated in FIG. 3. In some cases, the payload object may comprise a series of objects with various dependencies. For example, if the selected communication type is a series of related emails (e.g., a series of related marketing emails), then the created payload object may include a series of dependent objects corresponding to each of the series of emails. Furthermore, different data pieces may have corresponding objects. For example, if a single email offer includes an offer identifier as a value 375, then the offer identifier may point or link to another object that includes the data corresponding to the offer, such as offer name, headline, image, text, etc. In some cases, a user may create a communication and link to an existing offer via the offer identifier value 375. In another example, if the offer includes a speaker (e.g., for a webinar), then a field 370 may include a value 375 of a speaker identifier, which may correspond to a speaker object. The speaker object may include various data corresponding to the speaker.

Generation of the payload object 365 may include generating a set of target segment identifiers based on indications of target segments of the user population received at the UI component 330. The set of target segment identifiers may be associated with each field 370 or value 375 or with the object 365 as a whole. Further, generation of the payload object 365 may include generating additional content data based on indicated target segments or other received content. For example, if the user selects a certain product for the message, then the object generation component 340 may include an image of the product or other standardized image for the product in the payload object 365. A user may further input a task identifier at the UI supported by the UI component 330. The task identifier may identify a certain task associated with the organization (e.g., a cloud client 105 of FIG. 1). The task identifier may be utilized to track engagement metrics with various communications or other services provide by the organization. Generation of the object 365 may include associating the task identifier with each field of the object 365 or the object 365 as a whole.

The content management component 320 of the first server 310 transmits the payload object 365 to the second server 315. A communication component 325 of the second server receives the payload object 365 and stores content in a content data store 355. A communication engine 350 of the second server may process payload objects 365 and generate a message preview 308, which is transmitted to the preview component 345 of the first server 310. The preview 308 may be presented to one or more users via the UI component 330. If an authorized user approves the message based on the preview 308, then the object generation component may set a value 375 (e.g., a flag) of the corresponding object 365, which may launch the object 365 and trigger further processing of the object 365 by the communication engine 350.

Receipt of approval by an authorized may further lock the data (e.g., fields) of the object and prevent further editing, adding, or deletion of data associated with the object 365. Thus, when the flag or value 375 is set responsive to receipt of approval from the authorized user, then the data may be locked. When content is approved by an authorized user, the UI component 330 may push a notification to other users associated with the content or message feed. Further processing may include identifying subscribers from a subscriber data store 360 to receive content and generating and distributing messages populated with the content. Because the content may be stored as various linked objects 365, the communication engine is able to efficiently process the objects to identify matching subscribers, generate the messages, transmit the messages, and monitor feedback and associate the feedback with the content. In some cases, each piece of content may have a corresponding unique content identifier, and the communication engine 350 associated feedback metrics to the unique identifiers for efficient processing.

The communication engine 350 may support maintaining the subscriber data store 360 and the content data store 355. The communication engine 350 may include a persona engine, which may assign a persona record to a subscriber record (e.g., a user identifier), which may represent a prospect, customer, or other type of entity. A persona record may represent a subscriber associated sales department, a marketing department, an information technology (IT) department, or various other type of department. The persona records may be assigned based on the subscriber being associated with a prospect or customer based on an account type field in the subscriber record, based on a product interest field, job function, whether the subscriber owns a product, etc. The persona records may correspond to a target segment identifier included with various content objects. The communication engine 350 may assign various scores to subscribers, rank subscribers, etc.

The communication engine 350 may further include a scoring engine, which may assign scores to content items (e.g., content data or sets of content data) based on performance data (e.g., engagement data), which is determined based on communication feedback. A content item may be an offer item (e.g., a proposal to a customer to buy a product or service). The content scores may be assigned and recalculated at periodic intervals, during a maintenance automation, or at various other times. In some cases, the scores may be assigned to content after the content has been transmitted a threshold number of times. The scoring engine may rank filter, identify high performing or low performing content, etc. based on the scores, and in some cases, the scoring engine weights and normalizes various scores.

Using the scored subscribers and persona records associated with subscribers, the communication engine 350 may assign content items to subscriber records based on the scores associated with the content items. In some cases, the communication engine 350 considers whether the content has been viewed by certain subscribers, the period of time since last viewing, etc. Thus, the communication engine 350 may track view counts and last view dates. In some cases, the communication engine 350 utilizes a content items in a content pool, which may be ranked based on various factors (scoring, time since last transmission of the content, etc.). The communication engine 350 may consider various rules when assigning content from the pool to subscribers. The content pool may be used to identify a set of related content (e.g., for particular personas), and then assign the content to various users. The pool may be updated based on various factors, flags associated with the content, etc.

When considering whether to assign content to a particular subscriber, the communication engine 350 may consider the segment identifier associated with the content, personas and other identifiers associated with the subscribers. Thus, the communication engine 350 matches the subscribers to the content based on the identifiers, scores, etc. The communication engine 350 may continuously or periodically update scores, metrics, etc.

Figure 4:
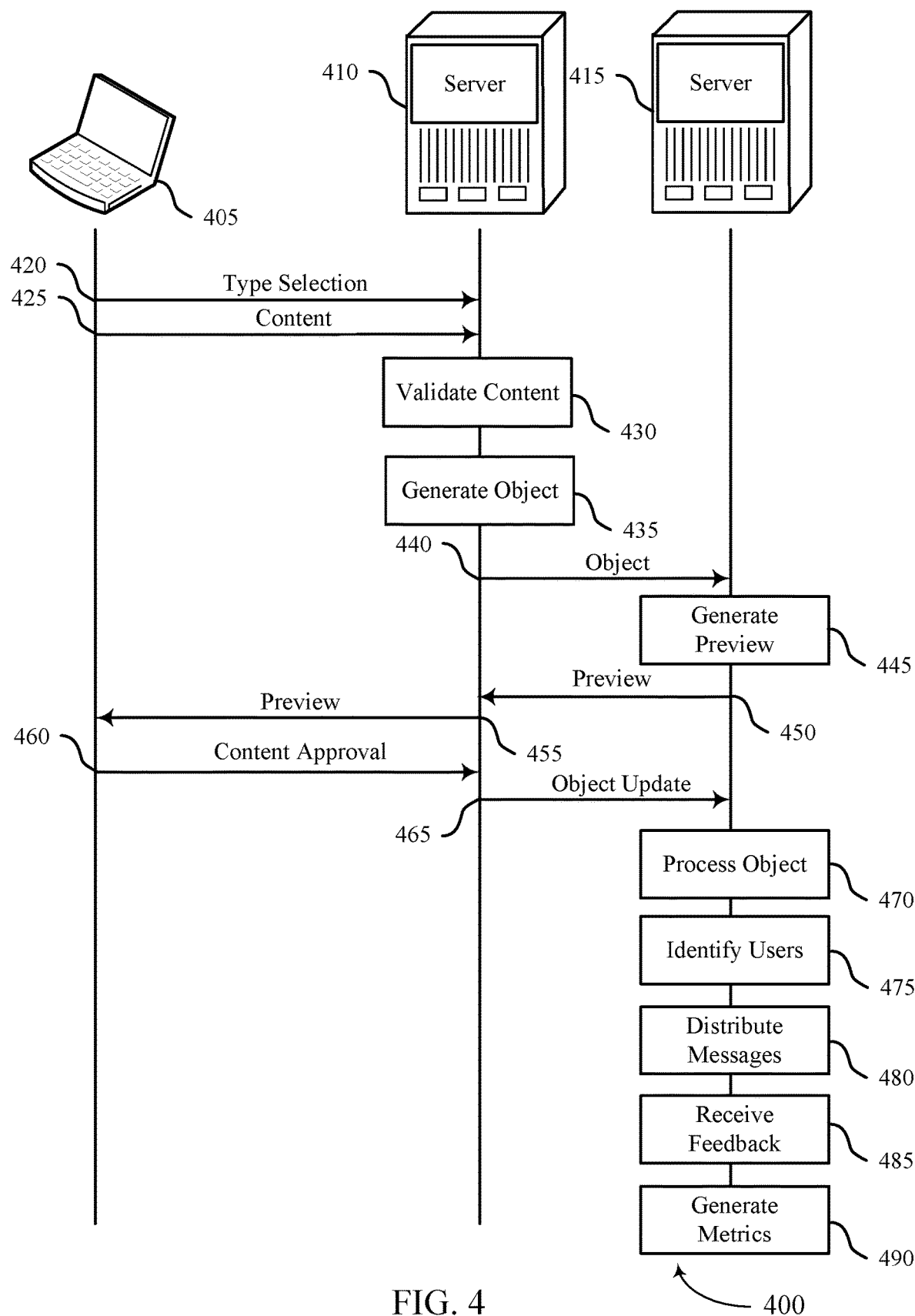
FIG. 4 illustrates an example of a process flow that illustrates data validation and digestible content object generation in accordance with aspects of the present disclosure.

FIG. 4 illustrates an example of a process flow 400 that illustrates data validation and digestible content object generation in accordance with aspects of the present disclosure. The process flow 400 includes a user device 405, which may be an example of the user device 205 of FIG. 2. The process flow 400 further includes a first server 410 and a second server 415, which may be examples of the corresponding servers 210, 215, 310, and 315 of FIGS. 2 and 3.

At 420, the user device 405 transmits an indication of a communication message type selection to the first server 410. The indication may be transmitted using a UI at the user device 405, and the UI may be supported by a UI component of the first server (e.g., UI component 330 of FIG. 3). The selected communication message type may be a push notification, email (e.g., single offer, email series, webinar), social media post, etc. Based on the type selection the UI at the user device 405 may be updated to display fields for receiving content input at the UI.

At 425, the user device 405 transmits a set of content data to the first server 410 via inputs at the UI. The content may be based on the selected communication message type. The content may be transmitted responsive to a save or submission. The content may include various information such as name, subject lines, images, copy, links, color, buttons, preheaders, speaker identifiers, task identifiers, etc. The set of content data may be associated with at least one indication of one or more target segments of a user population. Accordingly, the first server 410 receives the set of content data and at least one indication of one or more target segments of a user population.

At 430, the first server 410 validates the received content data using an application of rules to the received content. The applied rules may be based on the selected communication message type. The applied rules may determine whether the received content conforms to requirements of the organization and/or the second server 415 (e.g., a communication server). For example, the organization may have standards set for certain types of content, and the rules determine whether the received content conforms to the standards. Furthermore, the second server 415 may have data standardization requirements for efficient processing, and the rules determine whether such requirements are satisfied.

At 430, the first server 410 generates, based at least in part on validating the set of content data, a communication message content payload object including a field corresponding to each of the set of content data received. The communication message payload object includes the fields determined based on requirements defined by the second server 415, and the fields may further be determined based on the selected communication type. In some cases, the communication message content payload object includes a series of linked or dependent objects. In some cases, the generated communication message content payload object includes links or dependencies to previously generated objects. Generation of the object may include generating a set of target segment identifiers based on the indication of the one or more target segments.

At 440, the first server 410 transmits and indication of the digital communication message content payload object to the second server 415. The transmission may export the object from the first server 410 to the second server 415 and may be performed via a series or batch of API calls to the second server 415.

At 445, the second server 415 generates a message preview of one or more messages based on the data included in the content object. The message preview may include HTML or other formatting language that defines visual aspects of the message and may further include content of the payload object, such as a subject line, images, links, etc. The message preview may be generated via population of a preformatted message object.

At 450, the second server 415 transmits and indication of the message preview to the first server 410, which transmits an indication of the preview to the user device 405 at 455. The indications may be transmitted via links. In some cases, the indication to the user device 405 notifies one or more users of the user device (e.g., or other devices of a cloud client 105 of FIG. 1, for example) that the preview is available for review.

At 460, the user device 405 transmits an indication of content approval. The user device 405 may be a different device than previous operations, as the user device 405 may correspond to a device of an authorized user. The approval may be transmitted by a marketing manager, coordinator, etc. of a user that is authorized to approve message content.

At 465, responsive to receiving the content approval from an authorized user, the first server 410 transmits an object update to the second server 415. The object update may include an indication of the generated payload object. The update may update a flag or other field associated with the communication message content payload object.

Responsive to receiving the object update, the second server 415 may perform a series of operations for message deployment. The operations may include processing the object at 470. The processing may include identifying target segment identifiers associated with the object or the content of the object, identifying any time lines associated with the object (e.g., start date, end date), etc. Based on the target segment identifiers associated with the object, the second server 415 may identify a set of user identifiers. The second server 415 may store and manage a set of user identifiers and attributes associated with the user identifiers. Based on the attributes, the second server 415 may associate a set of target segment identifiers with the users, and the target segment identifier signify membership in one or more groups or categories. For example, based on web activity or input, the second server 415 may associate an identifier that signifies potential interest in a product offered by the organization. If an identifier associated with the object matches an identifier associated with a user, then the user may be identified for receiving the message.

At 480, the second server 415 may distribute a plurality of messages to user identifiers. The messages may be populated with content associated with the object, and the messages may be distributed based on one or more factors. For example, a first portion the identified user identifiers may receive a first version of a message, while a second portion of the identifiers may receive a second version of the message. Distribution of the message may include transmitting push notifications to devices associated with the user identifiers, transmitting emails to addresses associated with the user identifiers, posting social media messages, pushing advertisements to services utilized by the users associated with the identifiers, etc.

At 485, the second server 415 receives feedback associated with the distributed messages. The feedback may indicate whether the users opened, clicked, unsubscribed, etc. the respective messages. At 490, the second server may generate engagement metrics associated with the messages. The engagement metrics may indicate open rate, click rate, open to click rate, etc. The engagement metrics may be associated with the content that was included in the transmitted messages and the various segments of the user population which received the message. The engagement metrics may be further associated with the task identifier, which may be utilized by the organization to track various services associated with a task.

Figure 5:
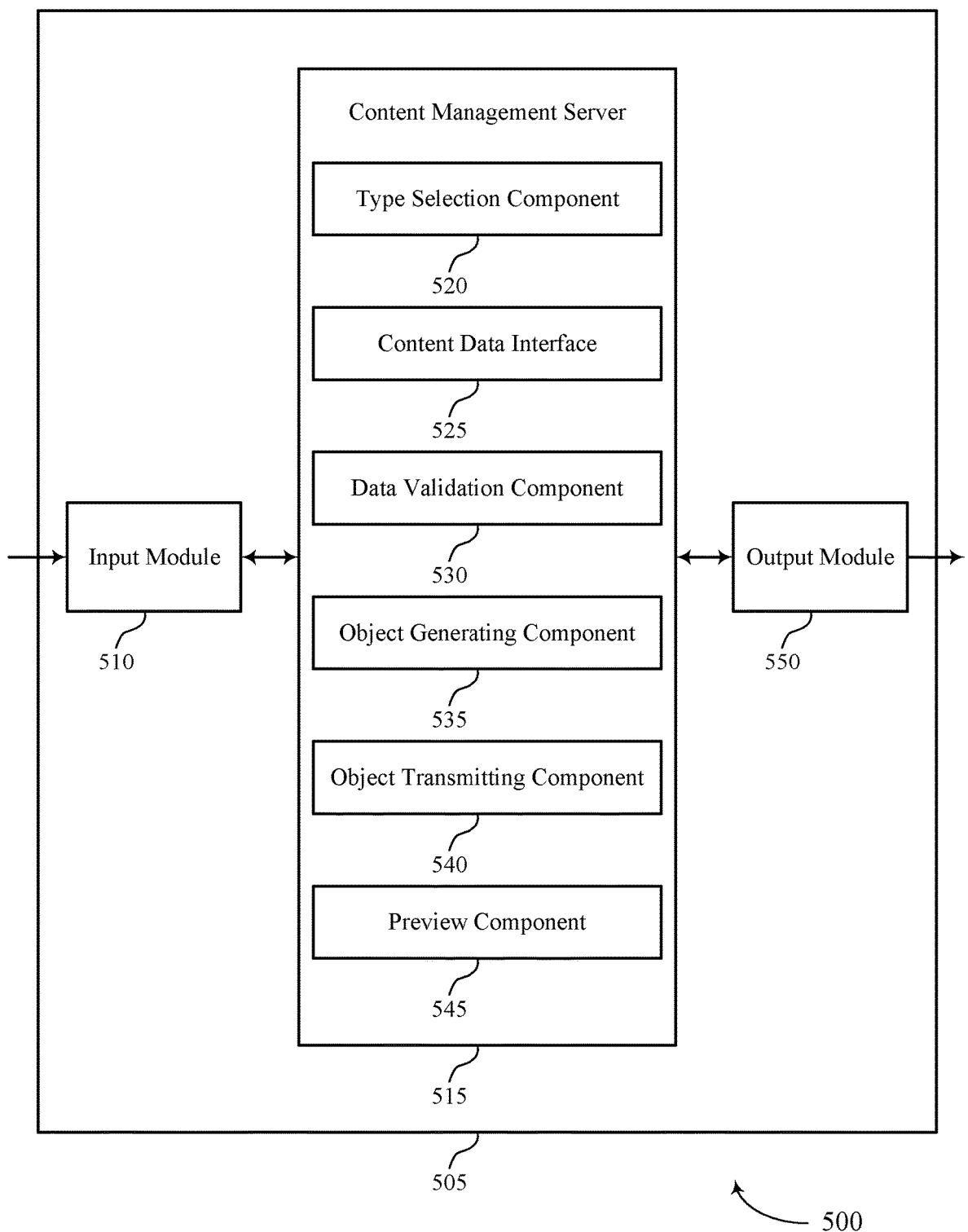
FIG. 5 shows a block diagram of an apparatus that supports data validation and digestible content object generation in accordance with aspects of the present disclosure.

FIG. 5 shows a block diagram 500 of an apparatus 505 that supports data validation and digestible content object generation in accordance with aspects of the present disclosure. The apparatus 505 may include an input module 510, a content management server 515, and an output module 550. The apparatus 505 may also include a processor. Each of these components may be in communication with one another (e.g., via one or more buses). In some cases, the apparatus 505 may be an example of a user terminal, a database server, or a system containing multiple computing devices.

The input module 510 may manage input signals for the apparatus 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the apparatus 505 for processing. For example, the input module 510 may transmit input signals to the content management server 515 to support data retention handling for data object stores. In some cases, the input module 510 may be a component of an input/output (I/O) controller 715 as described with reference to FIG. 7.

The content management server 515 may include a type selection component 520, a content data interface 525, a data validation component 530, an object generating component 535, an object transmitting component 540, and a preview component 545. The content management server 515 may be an example of aspects of the content management server 605 or 710 described with reference to FIGS. 6 and 7.

The content management server 515 and/or at least some of its various sub-components may be implemented in hardware, software executed by a processor, firmware, or any combination thereof. If implemented in software executed by a processor, the functions of the content management server 515 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The content management server 515 and/or at least some of its various sub-components may be physically located at various positions, including being distributed such that portions of functions are implemented at different physical locations by one or more physical devices. In some examples, the content management server 515 and/or at least some of its various sub-components may be a separate and distinct component in accordance with various aspects of the present disclosure. In other examples, the content management server 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The type selection component 520 may receive, at a first server, a selection of a digital communication message type. The content data interface 525 may receive a set of content data corresponding to the selected digital communication message type and at least one indication of one or more target segments of a user population. The data validation component 530 may validate the set of content data based on an application of a set of rules to the set of content data, the set of rules determined based on the selected digital communication message type.

The object generating component 535 may generate, based on validating the set of content data, a digital communication message content payload object including at least one field corresponding to each of the set of content data, the digital communication message content payload object including the at least one field determined based on data requirements defined by a second server and corresponding to the selected digital communication message type. The object transmitting component 540 may transmit an indication of the digital communication message content payload object to the second server.

The preview component 545 may receive, from the second server, a message preview indication providing at least one link to at least one digital communication message preview generated by the second server and including at least some of the set of content data received at the first server.

The output module 550 may manage output signals for the apparatus 505. For example, the output module 550 may receive signals from other components of the apparatus 505, such as the content management server 515, and may transmit these signals to other components or devices. In some specific examples, the output module 550 may transmit output signals for display in a user interface, for storage in a database or data store, for further processing at a server or server cluster, or for any other processes at any number of devices or systems. In some cases, the output module 550 may be a component of an I/O controller 715 as described with reference to FIG. 7.

Figure 6:
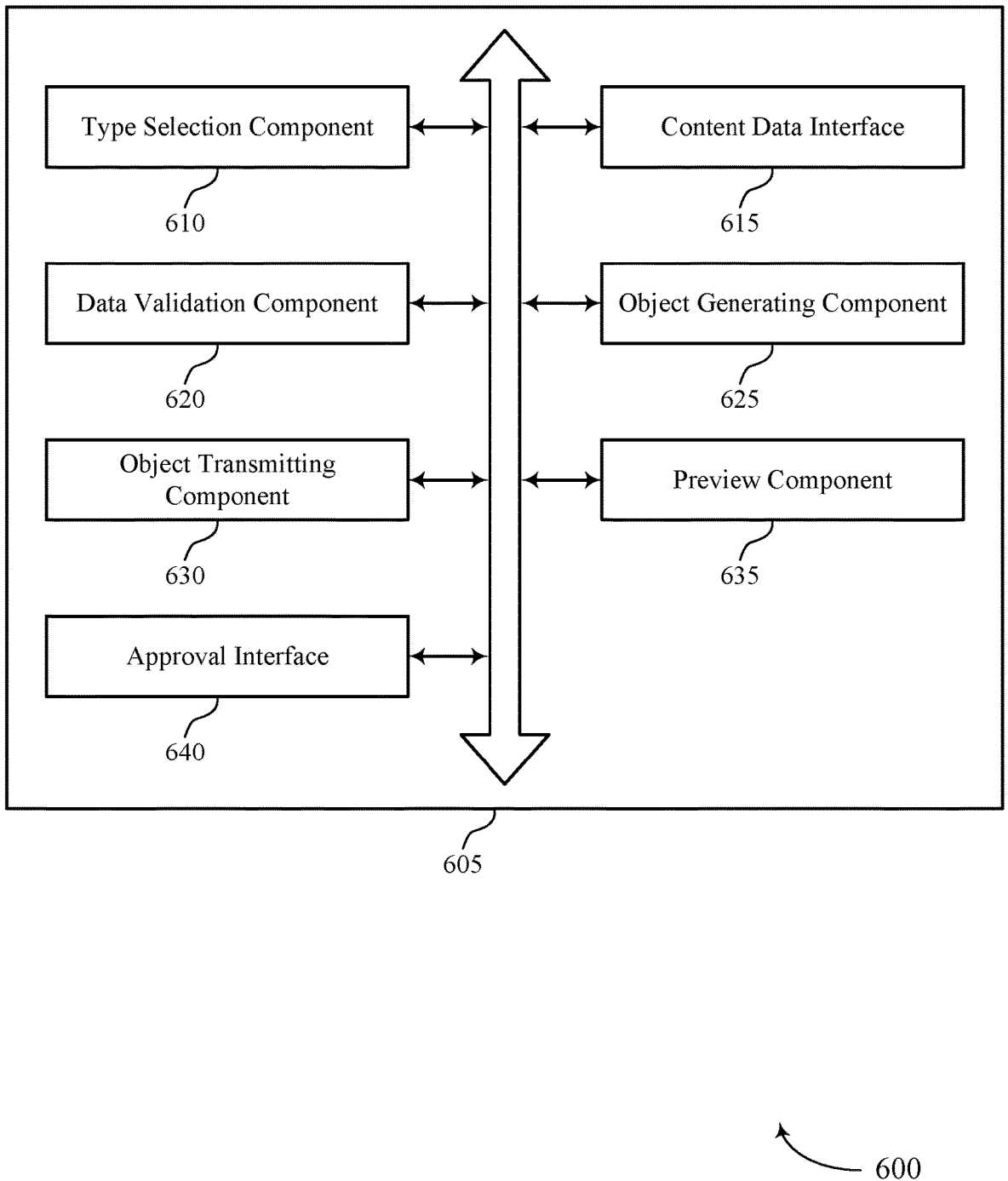
FIG. 6 shows a block diagram of a content management server that supports data validation and digestible content object generation in accordance with aspects of the present disclosure.

FIG. 6 shows a block diagram 600 of a content management server 605 that supports data validation and digestible content object generation in accordance with aspects of the present disclosure. The content management server 605 may be an example of aspects of a content management server 515 or a content management server 710 described herein. The content management server 605 may include a type selection component 610, a content data interface 615, a data validation component 620, an object generating component 625, an object transmitting component 630, a preview component 635, and an approval interface 640. Each of these modules may communicate, directly or indirectly, with one another (e.g., via one or more buses).

The type selection component 610 may receive, at a first server, a selection of a digital communication message type.

The content data interface 615 may receive a set of content data corresponding to the selected digital communication message type and at least one indication of one or more target segments of a user population. In some examples, the content data interface 615 may receive a selection of a digital communication message template. In some examples, the content data interface 615 may receive a task identifier. In some examples, the content data interface 615 may receive an indication of approval of the set of content data from an authorized user. In some examples, the content data interface 615 may provide a display of input fields based on an access level of user, where the input fields are configured to receive one or more of the set of content data. In some cases, the set of content data includes an indication of a time period, and where the digital communication message payload object includes a field representing the indicated time period. In some cases, the indication of the one or more target segments is based on a selection of a product interest, a business size, a customer type, a persona, a job level, a location, a language, or a combination thereof. The data validation component 620 may validate the set of content data based on an application of a set of rules to the set of content data, the set of rules determined based on the selected digital communication message type.

The object generating component 625 may generate, based on validating the set of content data, a digital communication message content payload object including at least one field corresponding to each of the set of content data, the digital communication message content payload object including the at least one field determined based on data requirements defined by a second server and corresponding to the selected digital communication message type. In some examples, the object generating component 625 may generate the digital communication payload object further based on the selected digital communication message template. In some examples, the object generating component 625 may generate a set of target segment identifiers based on the indication of the one or more target segments of the user population.

In some examples, the object generating component 625 may associate the set of target segment identifiers with each field of the digital communication message content payload object. In some examples, the object generating component 625 may generate additional content data on the at least one indication of one or more target segments of the user population, where the additional content data is included in the generated digital communication message content payload object. In some examples, the object generating component 625 may associate the task identifier with each field of the digital communication message content payload object, the second server using the task identifier to track engagement metrics associated with a set of digital communication messages generated based on the digital communication message content payload object. In some examples, the object generating component 625 may update a flag associated with the digital communication payload object responsive to receiving the indication of approval. In some examples, the object generating component 625 may lock the set of content data associated with the digital communication payload object based on the updated flag. The object transmitting component 630 may transmit an indication of the digital communication message content payload object to the second server.

The preview component 635 may receive, from the second server, a message preview indication providing at least one link to at least one digital communication message preview generated by the second server and including at least some of the set of content data received at the first server. The approval interface 640 may transmit an approval indication to another user based on the received approval.

Figure 7:
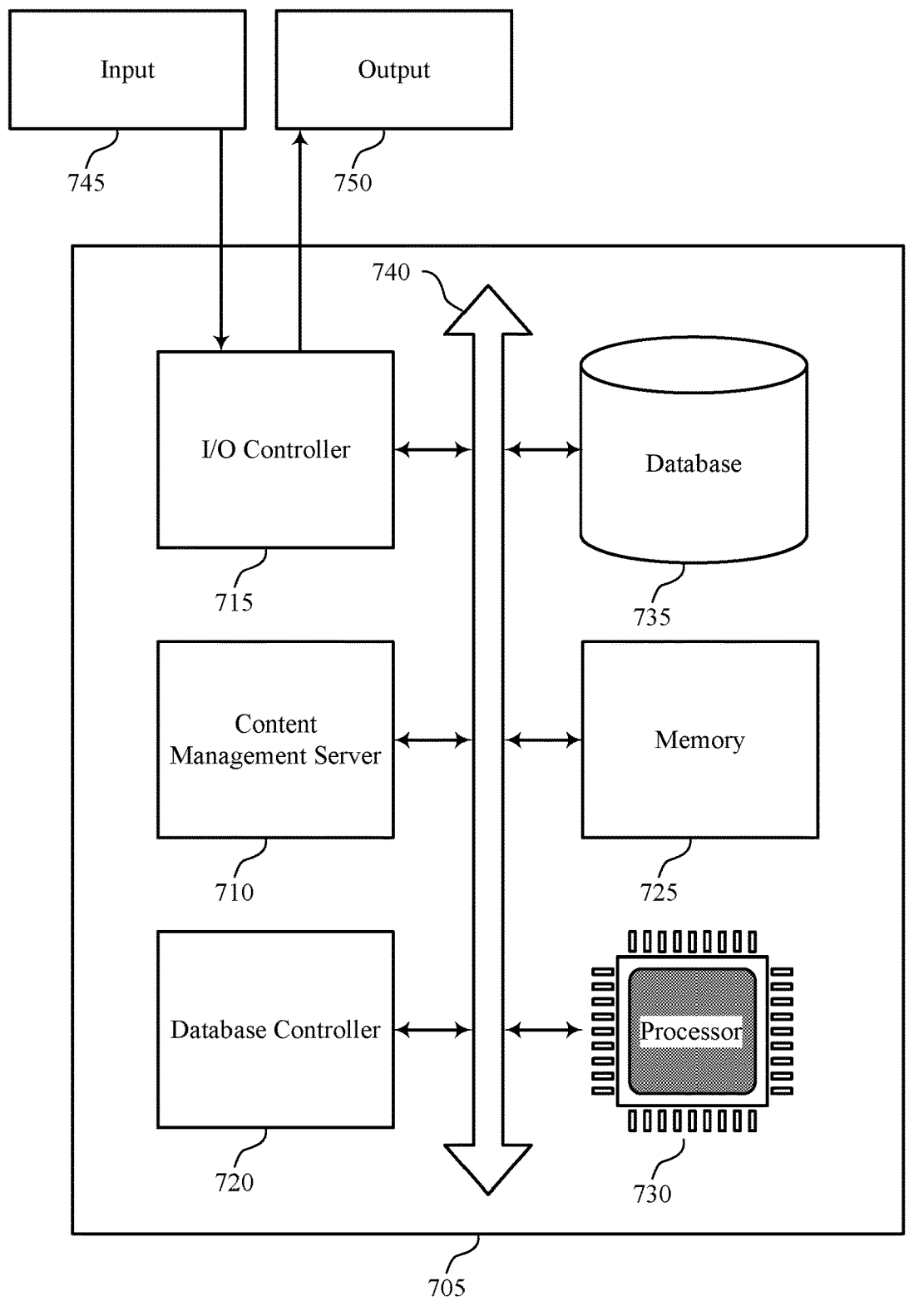
FIG. 7 shows a diagram of a system including a device that supports data validation and digestible content object generation in accordance with aspects of the present disclosure.

FIG. 7 shows a diagram of a system 700 including a device 705 that supports data validation and digestible content object generation in accordance with aspects of the present disclosure. The device 705 may be an example of or include the components of an application server or an apparatus 505 as described herein. The device 705 may include components for bi-directional data communications including components for transmitting and receiving communications, including a content management server 710, an I/O controller 715, a database controller 720, memory 725, a processor 730, and a database 735. These components may be in electronic communication via one or more buses (e.g., bus 740).

The content management server 710 may be an example of a content management server 515 or 605 as described herein. For example, the content management server 710 may perform any of the methods or processes described herein with reference to FIGS. 5 and 6. In some cases, the content management server 710 may be implemented in hardware, software executed by a processor, firmware, or any combination thereof.

The I/O controller 715 may manage input signals 745 and output signals 750 for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The database controller 720 may manage data storage and processing in a database 735. In some cases, a user may interact with the database controller 720. In other cases, the database controller 720 may operate automatically without user interaction. The database 735 may be an example of a single database, a distributed database, multiple distributed databases, a data store, a data lake, or an emergency backup database.

Memory 725 may include random-access memory (RAM) and read-only memory (ROM). The memory 725 may store computer-readable, computer-executable software including instructions that, when executed, cause the processor to perform various functions described herein. In some cases, the memory 725 may contain, among other things, a basic input/output system (BIOS) which may control basic hardware or software operation such as the interaction with peripheral components or devices.

The processor 730 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting data validation and digestible content object generation).

Figure 8:
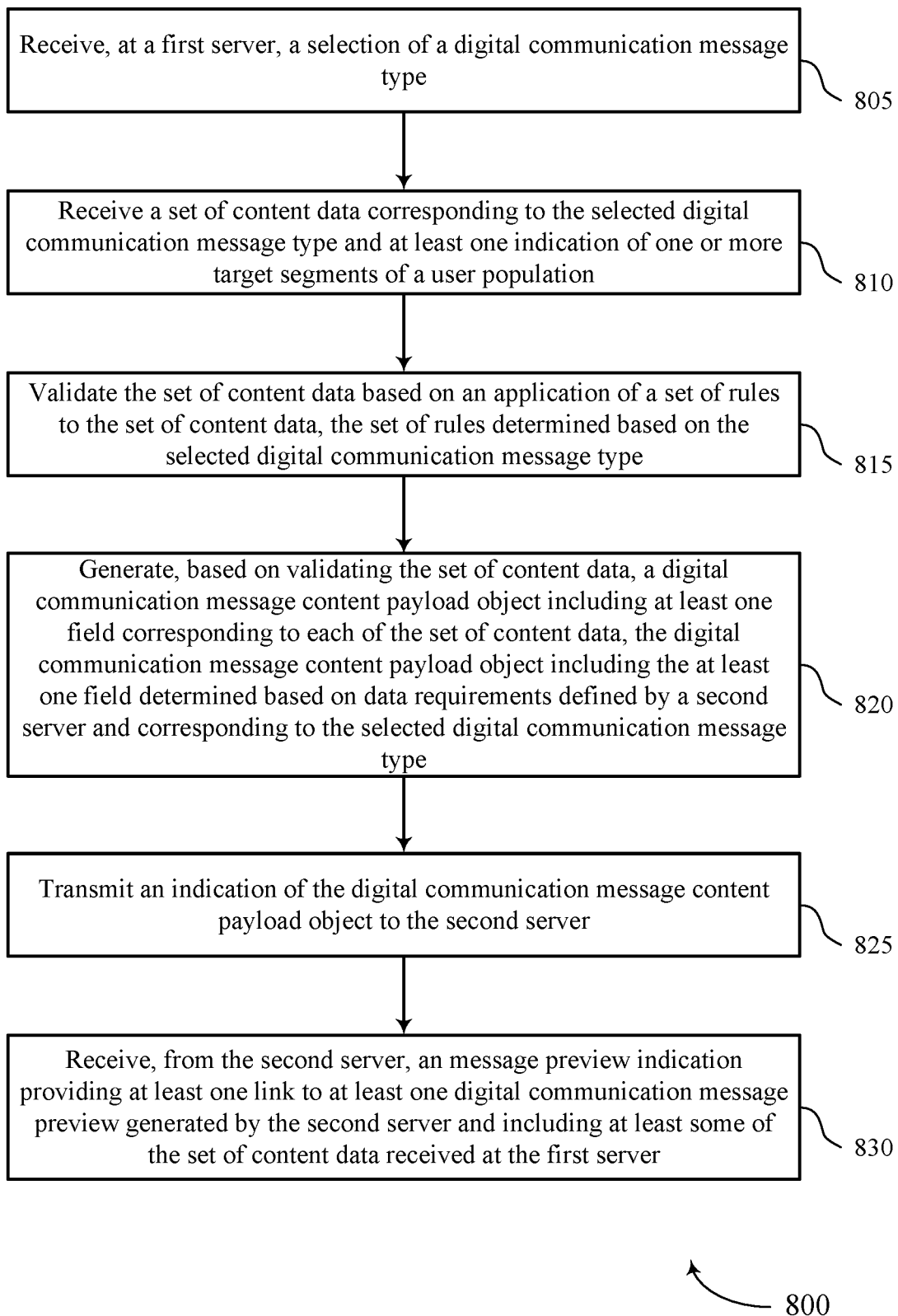

FIG. 8 shows a flowchart illustrating a method 800 that supports data validation and digestible content object generation in accordance with aspects of the present disclosure. The operations of method 800 may be implemented by an application server or its components as described herein. For example, the operations of method 800 may be performed by a content management server as described with reference to FIGS. 5 through 7. In some examples, an application server may execute a set of instructions to control the functional elements of the application server to perform the functions described herein. Additionally or alternatively, an application server may perform aspects of the functions described herein using special-purpose hardware.

At 805, the application server may receive, at a first server, a selection of a digital communication message type. The operations of 805 may be performed according to the methods described herein. In some examples, aspects of the operations of 805 may be performed by a type selection component as described with reference to FIGS. 5 through 7.

At 810, the application server may receive a set of content data corresponding to the selected digital communication message type and at least one indication of one or more target segments of a user population. The operations of 810 may be performed according to the methods described herein. In some examples, aspects of the operations of 810 may be performed by a content data interface as described with reference to FIGS. 5 through 7.

At 815, the application server may validate the set of content data based on an application of a set of rules to the set of content data, the set of rules determined based on the selected digital communication message type. The operations of 815 may be performed according to the methods described herein. In some examples, aspects of the operations of 815 may be performed by a data validation component as described with reference to FIGS. 5 through 7.

At 820, the application server may generate, based on validating the set of content data, a digital communication message content payload object including at least one field corresponding to each of the set of content data, the digital communication message content payload object including the at least one field determined based on data requirements defined by a second server and corresponding to the selected digital communication message type. The operations of 820 may be performed according to the methods described herein. In some examples, aspects of the operations of 820 may be performed by an object generating component as described with reference to FIGS. 5 through 7.

At 825, the application server may transmit an indication of the digital communication message content payload object to the second server. The operations of 825 may be performed according to the methods described herein. In some examples, aspects of the operations of 825 may be performed by an object transmitting component as described with reference to FIGS. 5 through 7.

At 830, the application server may receive, from the second server, a message preview indication providing at least one link to at least one digital communication message preview generated by the second server and including at least some of the set of content data received at the first server. The operations of 830 may be performed according to the methods described herein. In some examples, aspects of the operations of 830 may be performed by a preview component as described with reference to FIGS. 5 through 7.

Figure 9:
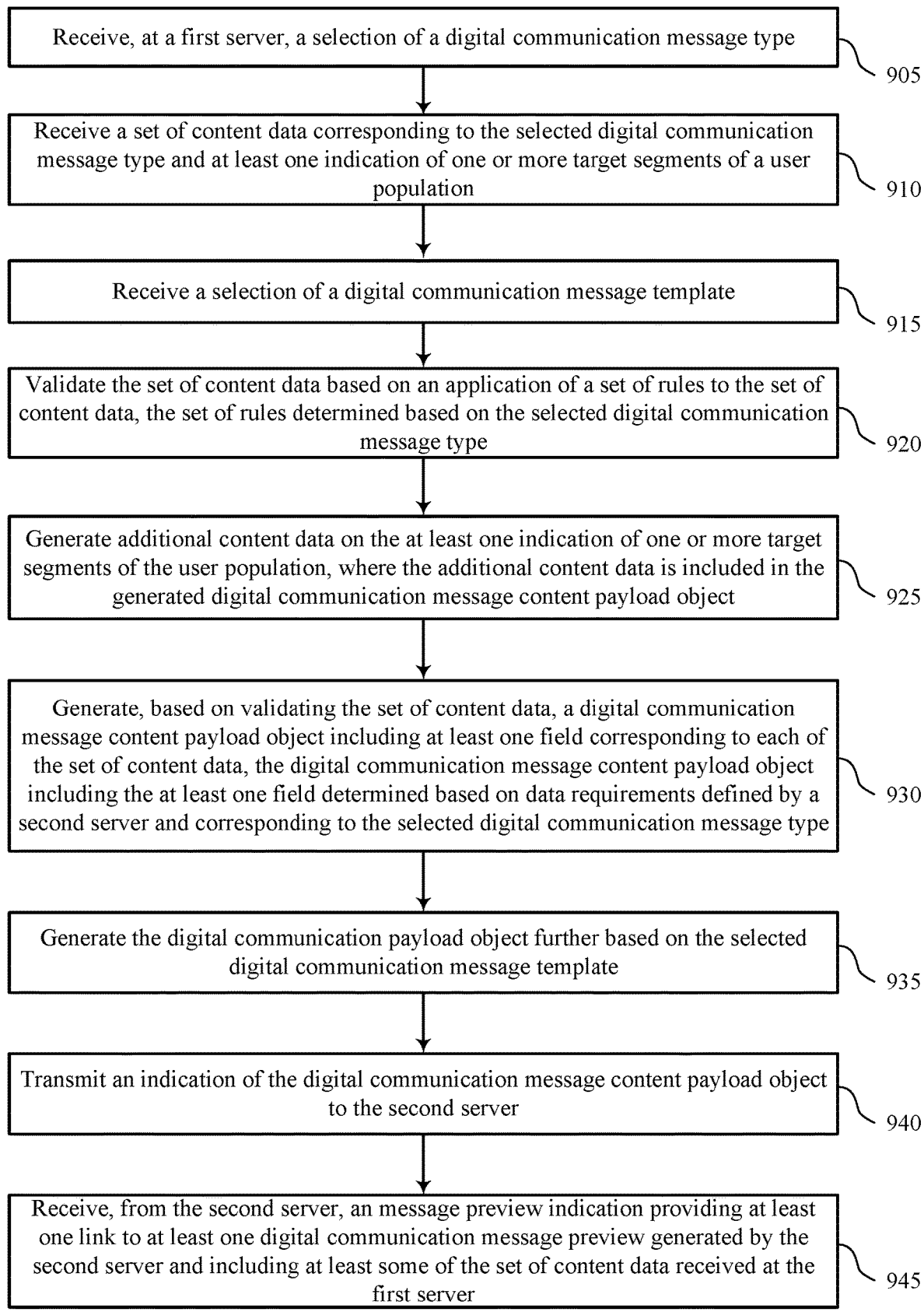

FIG. 9 shows a flowchart illustrating a method 900 that supports data validation and digestible content object generation in accordance with aspects of the present disclosure. The operations of method 900 may be implemented by an application server or its components as described herein. For example, the operations of method 900 may be performed by a content management server as described with reference to FIGS. 5 through 7. In some examples, an application server may execute a set of instructions to control the functional elements of the application server to perform the functions described herein. Additionally or alternatively, an application server may perform aspects of the functions described herein using special-purpose hardware.

At 905, the application server may receive, at a first server, a selection of a digital communication message type. The operations of 905 may be performed according to the methods described herein. In some examples, aspects of the operations of 905 may be performed by a type selection component as described with reference to FIGS. 5 through 7.

At 910, the application server may receive a set of content data corresponding to the selected digital communication message type and at least one indication of one or more target segments of a user population. The operations of 910 may be performed according to the methods described herein. In some examples, aspects of the operations of 910 may be performed by a content data interface as described with reference to FIGS. 5 through 7.

At 915, the application server may receive a selection of a digital communication message template. The operations of 915 may be performed according to the methods described herein. In some examples, aspects of the operations of 915 may be performed by a content data interface as described with reference to FIGS. 5 through 7.

At 920, the application server may validate the set of content data based on an application of a set of rules to the set of content data, the set of rules determined based on the selected digital communication message type. The operations of 920 may be performed according to the methods described herein. In some examples, aspects of the operations of 920 may be performed by a data validation component as described with reference to FIGS. 5 through 7.

At 925, the application server may generate additional content data on the at least one indication of one or more target segments of the user population, where the additional content data is included in the generated digital communication message content payload object. The operations of 925 may be performed according to the methods described herein. In some examples, aspects of the operations of 925 may be performed by an object generating component as described with reference to FIGS. 5 through 7.

At 930, the application server may generate, based on validating the set of content data, a digital communication message content payload object including at least one field corresponding to each of the set of content data, the digital communication message content payload object including the at least one field determined based on data requirements defined by a second server and corresponding to the selected digital communication message type. The operations of 930 may be performed according to the methods described herein. In some examples, aspects of the operations of 930 may be performed by an object generating component as described with reference to FIGS. 5 through 7.

At 935, the application server may generate the digital communication payload object further based on the selected digital communication message template. The operations of 935 may be performed according to the methods described herein. In some examples, aspects of the operations of 935 may be performed by an object generating component as described with reference to FIGS. 5 through 7.

At 940, the application server may transmit an indication of the digital communication message content payload object to the second server. The operations of 940 may be performed according to the methods described herein. In some examples, aspects of the operations of 940 may be performed by an object transmitting component as described with reference to FIGS. 5 through 7.

At 945, the application server may receive, from the second server, a message preview indication providing at least one link to at least one digital communication message preview generated by the second server and including at least some of the set of content data received at the first server. The operations of 945 may be performed according to the methods described herein. In some examples, aspects of the operations of 945 may be performed by a preview component as described with reference to FIGS. 5 through 7.

Figure 10:
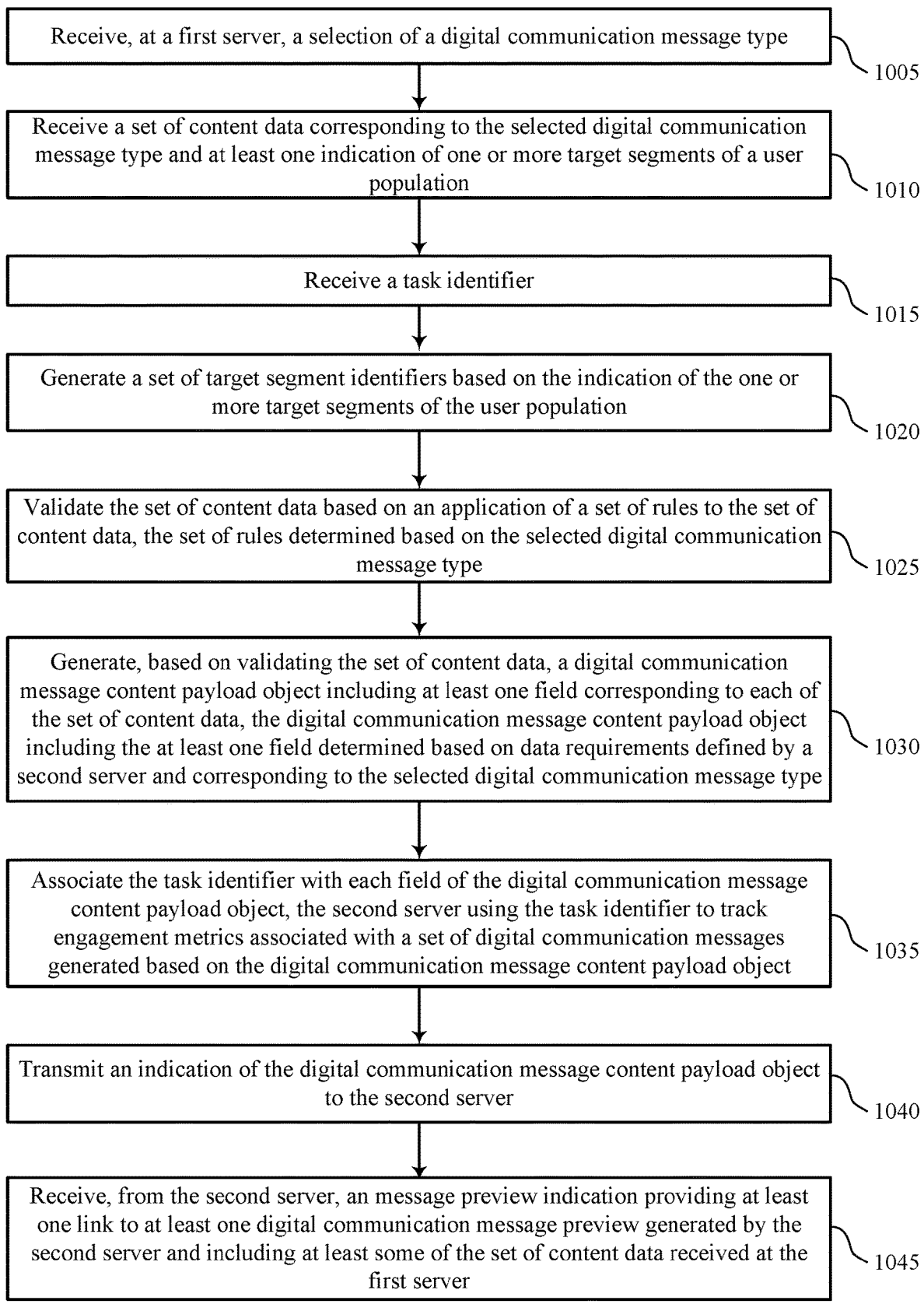

FIG. 10 shows a flowchart illustrating a method 1000 that supports data validation and digestible content object generation in accordance with aspects of the present disclosure. The operations of method 1000 may be implemented by an application server or its components as described herein. For example, the operations of method 1000 may be performed by a content management server as described with reference to FIGS. 5 through 7. In some examples, an application server may execute a set of instructions to control the functional elements of the application server to perform the functions described herein. Additionally or alternatively, an application server may perform aspects of the functions described herein using special-purpose hardware.

At 1005, the application server may receive, at a first server, a selection of a digital communication message type. The operations of 1005 may be performed according to the methods described herein. In some examples, aspects of the operations of 1005 may be performed by a type selection component as described with reference to FIGS. 5 through 7.

At 1010, the application server may receive a set of content data corresponding to the selected digital communication message type and at least one indication of one or more target segments of a user population. The operations of 1010 may be performed according to the methods described herein. In some examples, aspects of the operations of 1010 may be performed by a content data interface as described with reference to FIGS. 5 through 7.

At 1015, the application server may receive a task identifier. The operations of 1015 may be performed according to the methods described herein. In some examples, aspects of the operations of 1015 may be performed by a content data interface as described with reference to FIGS. 5 through 7.

At 1020, the application server may generate a set of target segment identifiers based on the indication of the one or more target segments of the user population. The operations of 1020 may be performed according to the methods described herein. In some examples, aspects of the operations of 1020 may be performed by an object generating component as described with reference to FIGS. 5 through 7.

At 1025, the application server may validate the set of content data based on an application of a set of rules to the set of content data, the set of rules determined based on the selected digital communication message type. The operations of 1025 may be performed according to the methods described herein. In some examples, aspects of the operations of 1025 may be performed by a data validation component as described with reference to FIGS. 5 through 7.

At 1030, the application server may generate, based on validating the set of content data, a digital communication message content payload object including at least one field corresponding to each of the set of content data, the digital communication message content payload object including the at least one field determined based on data requirements defined by a second server and corresponding to the selected digital communication message type. The operations of 1030 may be performed according to the methods described herein. In some examples, aspects of the operations of 1030 may be performed by an object generating component as described with reference to FIGS. 5 through 7.

At 1035, the application server may associate the task identifier with each field of the digital communication message content payload object, the second server using the task identifier to track engagement metrics associated with a set of digital communication messages generated based on the digital communication message content payload object. The operations of 1035 may be performed according to the methods described herein. In some examples, aspects of the operations of 1035 may be performed by an object generating component as described with reference to FIGS. 5 through 7.

At 1040, the application server may transmit an indication of the digital communication message content payload object to the second server. The operations of 1040 may be performed according to the methods described herein. In some examples, aspects of the operations of 1040 may be performed by an object transmitting component as described with reference to FIGS. 5 through 7.

At 1045, the application server may receive, from the second server, a message preview indication providing at least one link to at least one digital communication message preview generated by the second server and including at least some of the set of content data received at the first server. The operations of 1045 may be performed according to the methods described herein. In some examples, aspects of the operations of 1045 may be performed by a preview component as described with reference to FIGS. 5 through 7.

FIG. 11 shows a flowchart illustrating a method 1100 that supports data validation and digestible content object generation in accordance with aspects of the present disclosure. The operations of method 1100 may be implemented by an application server or its components as described herein. For example, the operations of method 1100 may be performed by a content management server as described with reference to FIGS. 5 through 7. In some examples, an application server may execute a set of instructions to control the functional elements of the application server to perform the functions described herein. Additionally or alternatively, an application server may perform aspects of the functions described herein using special-purpose hardware.

At 1105, the application server may receive, at a first server, a selection of a digital communication message type. The operations of 1105 may be performed according to the methods described herein. In some examples, aspects of the operations of 1105 may be performed by a type selection component as described with reference to FIGS. 5 through 7.

At 1110, the application server may provide a display of input fields based on an access level of user, where the input fields are configured to receive one or more of the set of content data. The operations of 1110 may be performed according to the methods described herein. In some examples, aspects of the operations of 1110 may be performed by a content data interface as described with reference to FIGS. 5 through 7.

At 1115, the application server may receive a set of content data corresponding to the selected digital communication message type and at least one indication of one or more target segments of a user population. The operations of 1115 may be performed according to the methods described herein. In some examples, aspects of the operations of 1115 may be performed by a content data interface as described with reference to FIGS. 5 through 7.

At 1120, the application server may validate the set of content data based on an application of a set of rules to the set of content data, the set of rules determined based on the selected digital communication message type. The operations of 1120 may be performed according to the methods described herein. In some examples, aspects of the operations of 1120 may be performed by a data validation component as described with reference to FIGS. 5 through 7.

At 1125, the application server may generate, based on validating the set of content data, a digital communication message content payload object including at least one field corresponding to each of the set of content data, the digital communication message content payload object including the at least one field determined based on data requirements defined by a second server and corresponding to the selected digital communication message type. The operations of 1125 may be performed according to the methods described herein. In some examples, aspects of the operations of 1125 may be performed by an object generating component as described with reference to FIGS. 5 through 7.

At 1130, the application server may transmit an indication of the digital communication message content payload object to the second server. The operations of 1130 may be performed according to the methods described herein. In some examples, aspects of the operations of 1130 may be performed by an object transmitting component as described with reference to FIGS. 5 through 7.

At 1135, the application server may receive, from the second server, a message preview indication providing at least one link to at least one digital communication message preview generated by the second server and including at least some of the set of content data received at the first server. The operations of 1135 may be performed according to the methods described herein. In some examples, aspects of the operations of 1135 may be performed by a preview component as described with reference to FIGS. 5 through 7.

At 1140, the application server may receive an indication of approval of the set of content data from an authorized user. The operations of 1140 may be performed according to the methods described herein. In some examples, aspects of the operations of 1140 may be performed by a content data interface as described with reference to FIGS. 5 through 7.

At 1145, the application server may update a flag associated with the digital communication payload object responsive to receiving the indication of approval. The operations of 1145 may be performed according to the methods described herein. In some examples, aspects of the operations of 1145 may be performed by an object generating component as described with reference to FIGS. 5 through 7.

At 1150, the application server may lock the set of content data associated with the digital communication payload object based on the updated flag. The operations of 1150 may be performed according to the methods described herein. In some examples, aspects of the operations of 1150 may be performed by an object generating component as described with reference to FIGS. 5 through 7.

At 1155, the application server may transmit an approval indication to another user based on the received approval. The operations of 1155 may be performed according to the methods described herein. In some examples, aspects of the operations of 1155 may be performed by an approval interface as described with reference to FIGS. 5 through 7.

A method of data processing is described. The method may include receiving, at a first server, a selection of a digital communication message type, receiving a set of content data corresponding to the selected digital communication message type and at least one indication of one or more target segments of a user population, validating the set of content data based on an application of a set of rules to the set of content data, the set of rules determined based on the selected digital communication message type, generating, based on validating the set of content data, a digital communication message content payload object including at least one field corresponding to each of the set of content data, the digital communication message content payload object including the at least one field determined based on data requirements defined by a second server and corresponding to the selected digital communication message type, transmitting an indication of the digital communication message content payload object to the second server, and receiving, from the second server, a message preview indication providing at least one link to at least one digital communication message preview generated by the second server and including at least some of the set of content data received at the first server.

An apparatus for data processing is described. The apparatus may include a processor, memory in electronic communication with the processor, and instructions stored in the memory. The instructions may be executable by the processor to cause the apparatus to receive, at a first server, a selection of a digital communication message type, receive a set of content data corresponding to the selected digital communication message type and at least one indication of one or more target segments of a user population, validate the set of content data based on an application of a set of rules to the set of content data, the set of rules determined based on the selected digital communication message type, generate, based on validating the set of content data, a digital communication message content payload object including at least one field corresponding to each of the set of content data, the digital communication message content payload object including the at least one field determined based on data requirements defined by a second server and corresponding to the selected digital communication message type, transmit an indication of the digital communication message content payload object to the second server, and receive, from the second server, a message preview indication providing at least one link to at least one digital communication message preview generated by the second server and including at least some of the set of content data received at the first server.

Another apparatus for data processing is described. The apparatus may include means for receiving, at a first server, a selection of a digital communication message type, receiving a set of content data corresponding to the selected digital communication message type and at least one indication of one or more target segments of a user population, validating the set of content data based on an application of a set of rules to the set of content data, the set of rules determined based on the selected digital communication message type, generating, based on validating the set of content data, a digital communication message content payload object including at least one field corresponding to each of the set of content data, the digital communication message content payload object including the at least one field determined based on data requirements defined by a second server and corresponding to the selected digital communication message type, transmitting an indication of the digital communication message content payload object to the second server, and receiving, from the second server, a message preview indication providing at least one link to at least one digital communication message preview generated by the second server and including at least some of the set of content data received at the first server.

A non-transitory computer-readable medium storing code for data processing is described. The code may include instructions executable by a processor to receive, at a first server, a selection of a digital communication message type, receive a set of content data corresponding to the selected digital communication message type and at least one indication of one or more target segments of a user population, validate the set of content data based on an application of a set of rules to the set of content data, the set of rules determined based on the selected digital communication message type, generate, based on validating the set of content data, a digital communication message content payload object including at least one field corresponding to each of the set of content data, the digital communication message content payload object including the at least one field determined based on data requirements defined by a second server and corresponding to the selected digital communication message type, transmit an indication of the digital communication message content payload object to the second server, and receive, from the second server, a message preview indication providing at least one link to at least one digital communication message preview generated by the second server and including at least some of the set of content data received at the first server.

Some examples of the method, apparatuses, and non-transitory computer-readable medium described herein may further include operations, features, means, or instructions for receiving a selection of a digital communication message template, and generating the digital communication payload object further based on the selected digital communication message template.

Some examples of the method, apparatuses, and non-transitory computer-readable medium described herein may further include operations, features, means, or instructions for generating a set of target segment identifiers based on the indication of the one or more target segments of the user population.

Some examples of the method, apparatuses, and non-transitory computer-readable medium described herein may further include operations, features, means, or instructions for associating the set of target segment identifiers with each field of the digital communication message content payload object.

Some examples of the method, apparatuses, and non-transitory computer-readable medium described herein may further include operations, features, means, or instructions for generating additional content data on the at least one indication of one or more target segments of the user population, where the additional content data may be included in the generated digital communication message content payload object.

Some examples of the method, apparatuses, and non-transitory computer-readable medium described herein may further include operations, features, means, or instructions for receiving a task identifier, and associating the task identifier with each field of the digital communication message content payload object, the second server using the task identifier to track engagement metrics associated with a set of digital communication messages generated based on the digital communication message content payload object.

Some examples of the method, apparatuses, and non-transitory computer-readable medium described herein may further include operations, features, means, or instructions for receiving an indication of approval of the set of content data from an authorized user, and updating a flag associated with the digital communication payload object responsive to receiving the indication of approval.

Some examples of the method, apparatuses, and non-transitory computer-readable medium described herein may further include operations, features, means, or instructions for locking the set of content data associated with the digital communication payload object based on the updated flag.

Some examples of the method, apparatuses, and non-transitory computer-readable medium described herein may further include operations, features, means, or instructions for transmitting an approval indication to another user based on the received approval.

Some examples of the method, apparatuses, and non-transitory computer-readable medium described herein may further include operations, features, means, or instructions for providing a display of input fields based on an access level of user, where the input fields may be configured to receive one or more of the set of content data.

In some examples of the method, apparatuses, and non-transitory computer-readable medium described herein, the set of content data includes an indication of a time period, and where the digital communication message payload object includes a field representing the indicated time period.

In some examples of the method, apparatuses, and non-transitory computer-readable medium described herein, the indication of the one or more target segments may be based on a selection of a product interest, a business size, a customer type, a persona, a job level, a location, a language, or a combination thereof.

In some examples of the method, apparatuses, and non-transitory computer-readable medium described herein, the first server includes a content management server and the second server includes a communication server.

It should be noted that the methods described herein describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:
1. A method for data processing, comprising:
   receiving, at a first server, a selection of a digital communication message type;
   receiving, at the first server via a user interface supported by the first server, a set of content data corresponding to the selected digital communication message type and at least one indication of one or more target segments of a user population;
   validating, by one or more processors of the first server, the set of content data based at least in part on an application of a set of rules to the set of content data, the set of rules determined based at least in part on the selected digital communication message type;
   generating, by the one or more processors of the first server and based at least in part on validating the set of content data, a digital communication message content payload object including at least one field corresponding to each of the set of content data, the digital communication message content payload object including the at least one field determined based at least in part on data requirements defined by a second server and corresponding to the selected digital communication message type;
   transmitting, via an application programming interface, an indication of the digital communication message content payload object to the second server;
   receiving, from the second server, a message preview indication providing at least one link to at least one digital communication message preview generated by the second server and including at least some of the set of content data received at the first server;
receiving, at the first server, indication of approval of the set of content data from an authorized user;
updating, by the first server, a flag associated with the digital communication message content payload object responsive to receiving the indication of approval; and
transmitting, via the user interface supported by the first server, an approval indication to another user based at least in part on the received approval.

2. The method of claim 1, further comprising:
receiving a selection of a digital communication message template; and
generating the digital communication message content payload object further based at least in part on the selected digital communication message template.

3. The method of claim 1, further comprising:
generating a set of target segment identifiers based at least in part on the indication of the one or more target segments of the user population.

4. The method of claim 3, further comprising:
associating the set of target segment identifiers with each field of the digital communication message content payload object.

5. The method of claim 1, further comprising:
generating additional content data on the at least one indication of one or more target segments of the user population, wherein the additional content data is included in the generated digital communication message content payload object.

6. The method of claim 1, further comprising:
receiving a task identifier; and
associating the task identifier with each field of the digital communication message content payload object, the second server using the task identifier to track engagement metrics associated with a plurality of digital communication messages generated based at least in part on the digital communication message content payload object.

7. The method of claim 1, further comprising:
locking the set of content data associated with the digital communication message content payload object based at least in part on the updated flag.

8. The method of claim 1, further comprising:
providing a display of input fields based at least in part on an access level of user, wherein the input fields are configured to receive one or more of the set of content data.

9. The method of claim 1, wherein the set of content data includes an indication of a time period, and wherein the digital communication message content payload object includes a field representing the indicated time period.

10. The method of claim 1, wherein the indication of the one or more target segments is based at least in part on a selection of a product interest, a business size, a customer type, a persona, a job level, a location, a language, or a combination thereof.

11. The method of claim 1, wherein the first server comprises a content management server and the second server comprises a communication server.

12. An apparatus for data processing, comprising: a processor, memory in electronic communication with the processor; and instructions stored in the memory and executable by the processor to cause the apparatus to:
receive, at a first server, a selection of a digital communication message type;
receive, at the first server via a user interface supported by the first server, a set of content data corresponding to the selected digital communication message type and at least one indication of one or more target segments of a user population;
validate, by one or more processors of the first server, the set of content data based at least in part on an application of a set of rules to the set of content data, the set of rules determined based at least in part on the selected digital communication message type;
generate, by the one or more processors of the first server and based at least in part on validating the set of content data, a digital communication message content payload object including at least one field corresponding to each of the set of content data, the digital communication message content payload object including the at least one field determined based at least in part on data requirements defined by a second server and corresponding to the selected digital communication message type;
transmit, via an application programming interface, an indication of the digital communication message content payload object to the second server;
receive, from the second server, a message preview indication providing at least one link to at least one digital communication message preview generated by the second server and including at least some of the set of content data received at the first server;
receive at the first server, indication of approval of the set of content data from an authorized user;
update, by the first server, a flag associated with the digital communication message content payload object responsive to receiving the indication of approval; and
transmit, via the user interface supported by the first server, an approval indication to another user based at least in part on the received approval.

13. The apparatus of claim 12, wherein the instructions are further executable by the processor to cause the apparatus to:
generate a set of target segment identifiers based at least in part on the indication of the one or more target segments of the user population; and
associate the set of target segment identifiers with each field of the digital communication message content payload object.

14. The apparatus of claim 12, wherein the instructions are further executable by the processor to cause the apparatus to:
generate additional content data on the at least one indication of one or more target segments of the user population, wherein the additional content data is included in the generated digital communication message content payload object.

15. The apparatus of claim 12, wherein the instructions are further executable by the processor to cause the apparatus to:
receive a task identifier; and
associate the task identifier with each field of the digital communication message content payload object, the second server using the task identifier to track engagement metrics associated with a plurality of digital communication messages generated based at least in part on the digital communication message content payload object.

16. A non-transitory computer-readable medium storing code for data processing, the code comprising instructions executable by a processor to:

receive, at a first server, a selection of a digital communication message type;

receive, at the first server via a user interface supported by the first server, a set of content data corresponding to the selected digital communication message type and at least one indication of one or more target segments of a user population;

validate, by one or more processors of the first server, the set of content data based at least in part on an application of a set of rules to the set of content data, the set of rules determined based at least in part on the selected digital communication message type;

generate, by the one or more processors of the first server and based at least in part on validating the set of content data, a digital communication message content payload object including at least one field corresponding to each of the set of content data, the digital communication message content payload object including the at least one field determined based at least in part on data requirements defined by a second server and corresponding to the selected digital communication message type;

transmit, via an application programming interface, an indication of the digital communication message content payload object to the second server;

receive, from the second server, a message preview indication providing at least one link to at least one digital communication message preview generated by the second server and including at least some of the set of content data received at the first server;

receive at the first server, indication of approval of the set of content data from an authorized user;

update, by the first server, a flag associated with the digital communication message content payload object responsive to receiving the indication of approval; and transmit, via the user interface supported by the first server, an approval indication to another user based at least in part on the received approval.

17. The non-transitory computer-readable medium of claim 16, wherein the instructions are further executable to:

generate a set of target segment identifiers based at least in part on the indication of the one or more target segments of the user population; and associate the set of target segment identifiers with each field of the digital communication message content payload object.

18. The non-transitory computer-readable medium of claim 16, wherein the instructions are further executable to:

generate additional content data on the at least one indication of one or more target segments of the user population, wherein the additional content data is included in the generated digital communication message content payload object.

* * * * *